US009277052B2

(12) United States Patent
Bennett

(10) Patent No.: US 9,277,052 B2
(45) Date of Patent: Mar. 1, 2016

(54) PRE-CALL RECORDING

(71) Applicant: World Emergency Network—Nevada Ltd., Carson City, NV (US)

(72) Inventor: Christopher Ryan Bennett, St. Petersburg, FL (US)

(73) Assignee: World Emergency Network—Nevada, Ltd., Carson City, NV (US)

( * ) Notice: Subject to any disclaimer, the term of this patent is extended or adjusted under 35 U.S.C. 154(b) by 53 days.

(21) Appl. No.: 14/331,102

(22) Filed: Jul. 14, 2014

(65) Prior Publication Data

US 2015/0017961 A1   Jan. 15, 2015

Related U.S. Application Data

(60) Provisional application No. 61/845,371, filed on Jul. 12, 2013.

(51) Int. Cl.
H04M 3/42   (2006.01)
H04M 3/54   (2006.01)
H04M 3/51   (2006.01)

(52) U.S. Cl.
CPC ........ H04M 3/42221 (2013.01); H04M 3/5175 (2013.01); H04M 3/543 (2013.01)

(58) Field of Classification Search
CPC ...................................................... H04M 3/42
USPC .................................................... 379/142.04
See application file for complete search history.

(56) References Cited

U.S. PATENT DOCUMENTS

| | | | | |
|---|---|---|---|---|
| 6,650,633 | B1* | 11/2003 | Albers | H04L 12/24 370/352 |
| 7,245,713 | B1* | 7/2007 | Simpson | H04M 3/533 379/221.01 |
| 2005/0192035 | A1 | 9/2005 | Jiang | |
| 2006/0142012 | A1 | 6/2006 | Kirchhoff et al. | |
| 2009/0181641 | A1 | 7/2009 | Fiatal | |
| 2011/0026701 | A1* | 2/2011 | Kirchhoff | H04M 3/436 379/207.13 |

OTHER PUBLICATIONS

International Search Report and Written Opinion for International Application No. PCT/US2014/046562, Nov. 7, 2014, 13 pages.

* cited by examiner

Primary Examiner — Vladimir Magloire
Assistant Examiner — Majid Syed
(74) Attorney, Agent, or Firm — Fenwick & West LLP

(57) ABSTRACT

A recording of a subject is covertly generated prior to, and subsequent to an operator answering the call. The recording of the subject prior to the operator answering the call involves recording the subject and/or enabling the operator to listen in on the subject prior to indicating to the subject that the operator is communicating on the line. The subject is connected and a ring tone is generated and played back to the subject while audio received from the subject on the connection is recorded or otherwise monitored. Playback of the ringtone leads the subject to believe a connection has not yet been established. The operator may listen to the audio transmitted by the subject without the subject knowing the operator is covertly ascertaining situational information. The operator may provide a selection or answer the call to begin bi-direction communication with the subject which causes the ring tone to cease playing and lead the subject to believe the connection has just been established.

20 Claims, 10 Drawing Sheets

Map Virtual Number 350

| Mapping Table 360A | | |
|---|---|---|
| Transmitting Number 361A | Virtual Numbers 363A | Pre-Call Record 365 |
| 555-111-2222 ↔ | 555-999-8888 ↔ | Yes |
| 555-111-2222 ↔ | 555-999-7777 ↔ | No |

FIG. 3B

Map Virtual Number 350

| Mapping Table 360B | |
|---|---|
| Virtual Number 363C | Monitoring Numbers 367 |
| 555-999-8888 ↔ | 555-999-6666 |
| 555-999-8888 ↔ | 555-999-5555 |

FIG. 3C

PRE-CALL RECORDING

CROSS REFERENCE TO RELATED APPLICATIONS

This application claims the benefit of U.S. Provisional Application No. 61/845,371, filed Jul. 12, 2013, which is incorporated by reference in its entirety.

BACKGROUND

1. Field of Art

The present disclosure generally relates to the field of undercover operations and more specifically to covertly gathering situational information from a subject.

2. Background of the Invention

Police officers, informants and other agents "operators" oftentimes deal with nefarious subjects during the course of their duties. In many cases, the subjects are encountered during the course of undercover investigations that require the operator to use phones to call or otherwise communicate with the various subjects. Oftentimes, the subjects may ascertain information about the operator or a plan that may endanger the operator. For example, the subjects may discover that an informant is working with the police or discover the identity of an undercover officer. In such cases, the subjects attempt to hide that knowledge from the operator. Accordingly, an operator may subsequently encounter a subject unbeknownst that an assumed identity or plan is compromised.

In other situations, an operator such as a police negotiator may interact with subjects during a hostage crisis or standoff. Oftentimes, important information the operator requires to make decisions in the field relative to the situation can only be provided by the subject. In many cases, subjects are less than truthful and provide the operator with false or misleading information. Decisions based on the misleading information may diminish the safety of an entry team, hostages, and the subject himself.

While these difficulties are discussed with respect to an operator, private individuals (e.g., a business owner) and other entities may face similar difficulties.

BRIEF DESCRIPTION OF THE DRAWINGS

The teachings of the embodiments can be readily understood by considering the following detailed description in conjunction with the accompanying drawings.

FIGS. 3B and 3C are tables illustrating example embodiments of virtual number mapping for pre-call recording according to one example embodiment.

DETAILED DESCRIPTION

Figure 1A:
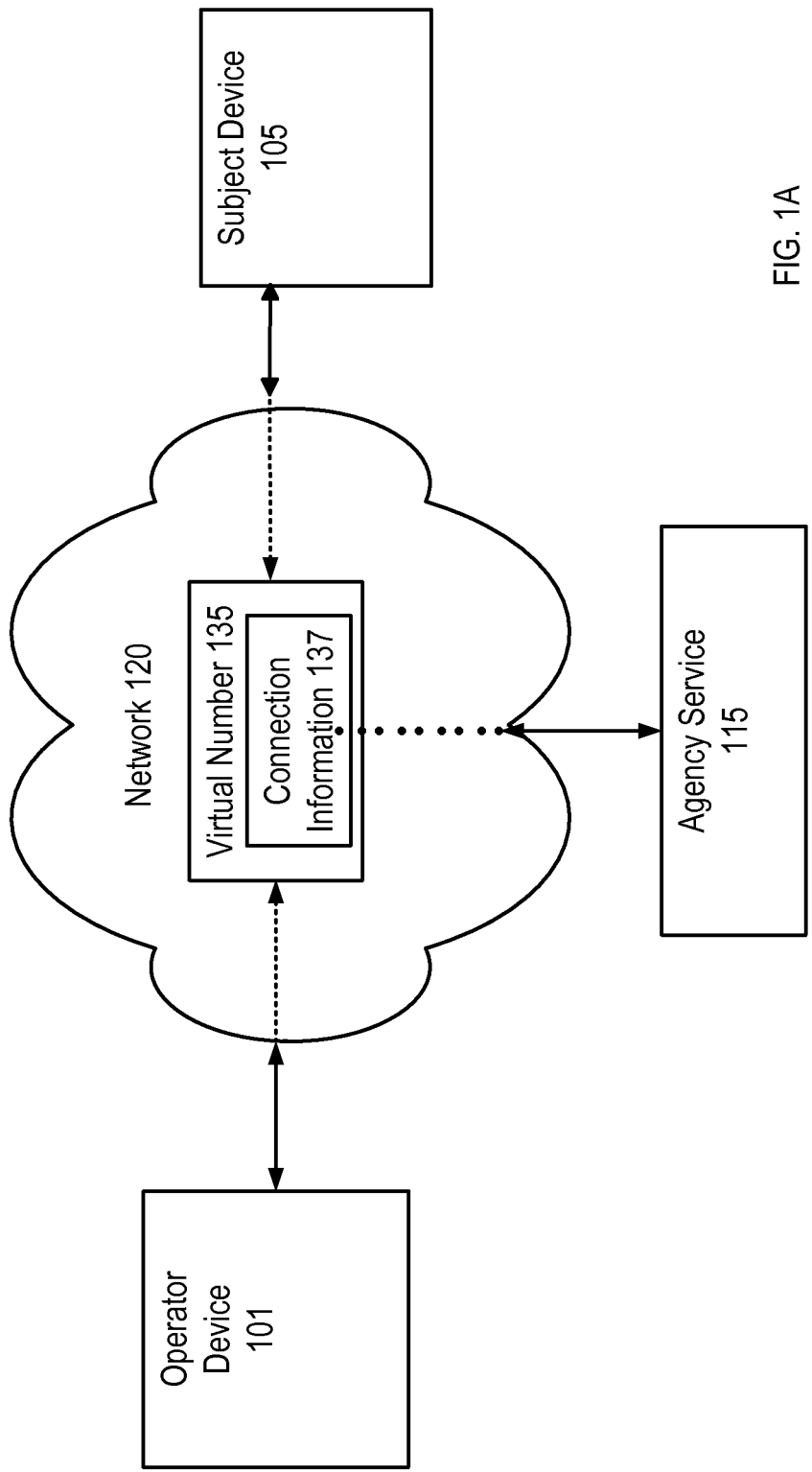
FIG. 1A is a block diagram illustrating an environment for implementing a pre-call recording system according to one example embodiment.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Overview

Traditionally, a standard phone call is conducted by the subject entering the phone number of the operator or selecting an address book entry, then pressing a physical or on-screen button to initiate the connection. Audio recordings may be collected if and only the operator answers the call to establish the connection.

Embodiments of systems and methods described herein relate to covertly generating an audio recording of a subject prior to, and subsequent to an operator answering the call. The recording, referred to herein as a "pre-call recording," involves recording the subject and/or enabling the operator to listen in on the subject prior to indicating to the subject that the operator is communicating on the line. For example, a ring tone may continue to play for the subject even after the operator has answered the call. The operator may then listen to the subject without the subject knowing the operator is covertly ascertaining situational information.

Additionally, a virtual number may be used to automatically establish a connection with the subject and begin a recording prior to enabling the operator to establish the connection with the subject. Thus, for example, a pre-call recording may begin as soon as possible without the operator involvement. A ring tone may be played on the virtual number for the subject while the pre-call recording is generated. The operator receives a connection request from the virtual number (which may be spoofed with subject device information) and may answer the call to establish a connection by way of the virtual number. Even after the operator answers the call, the ring tone may continue to play for the subject while the operator listens to audio from the subject's phone on the virtual number. The operator may be muted throughout the process to prevent the subject from becoming aware that the operator is listening to the call and/or the call is being recorded.

The operator may subsequently indicate when he wishes to communicate with the subject (e.g., through a key-in on the operator device). In turn, the ring tone played for the subject device e is stopped and the operator device is unmuted, thus leading the subject to believe that the operator has just established the connection by answering the call. However, the subject has unknowingly been providing the operator or agency with pre-call audio since the call was initiated.

In some embodiments, the operator may choose from additional options to covertly generate an audio recording or listen in on the subject. For example, the operator may choose to play a "busy" tone for the subject rather than establish the call. In another example, the operator may choose to play a "disconnect" tone for the subject rather than close the connection through ending the call. Thus, for example, the operator may covertly listen and/or record audio from the subject until the subject ends the call. In another example, the operator may choose to let the call go to voicemail and covertly listen to the subject prior to a voicemail recording.

In some embodiments, an agency may desire to monitor audio on the operator's line that is placing the call through the virtual number. As the operator connects to the virtual to place a call to the subject, audio may be recorded on the virtual number from the operator. Thus, for example, an informant may be covertly recorded when placing calls to the subject and the subject covertly recorded when placing calls to the informant. In such cases, the informant may unaware that subjects contacting the informant through the virtual number are being recorded while the informant's device is ringing. Accordingly, bi-directional communication between the informant and the subject may be established (and the ringing on the line stopped) when the informant answers the connection request. In such cases, the pre-call recording during the ringing may be ended without explicit input from the informant.

Depending on the embodiment, one or more monitoring devices are further configured to access and listen in on a pre-call recording and any subsequent conversation or covert audio gathering activity. For example, the monitoring devices may access a web interface, API or execute a standalone application for viewing operator device and virtual number details and collected information. In some embodiments, the monitoring devices may connect to the virtual number in a similar fashion as the operator device; however, audio from the monitoring device is muted to prevent the subject and operator from realizing the call is being monitored. Thus, the monitor may be provided with call audio while the operator's cover is maintained or without alerting an informant.

Environment and Implementation of the Pre-Call Recording System

FIG. 1A is a block diagram illustrating an environment 100 for implementing a pre-call recording system according to one example embodiment. As shown the environment 100 includes a network 120 connecting an agency support service provider "agency service" 115, an operator device 101 and subject device 105. While only one agency service 115, one subject device 105, and one operator device 101 are shown in FIG. 1A for clarity, embodiments can support many operator devices 101 and have multiple agency service providers 115 for managing pre-call recordings of multiple subject devices 105.

Agency service 115 represents a collection of compute devices (e.g., servers) and related storage mediums that are configured for performing various activities such as providing pre-call recording services, exchanging data over the network 120 and storing data in support of one or more agencies (not shown) and operated operator devices 101. For example, the agency service 115 may include one or more modules providing ascribed functionality to an agency via an application programming interface ("API") or web interface, collectively "the interface", as described in more detail with reference to FIG. 1B. The agency service 115 may also include infrastructure for providing audio communicability (e.g., internally and/or over the network 120) within the monitoring interface using the public switched telephone network ("PSTN") and voice over internet protocol ("VoIP").

The operator device 101 is oftentimes a mobile telephonic device capable of collecting data and transmitting data (e.g., wirelessly) over the network 120. Some examples of an operator device 101 include a mobile phone, tablet or notebook computer. Example embodiments of the operator device 101 as a mobile phone include feature phones, smart phones or standard mobile phones. Accordingly, a given mobile phone or other device operated as an operator device 101 may not necessarily include or support all of the functionality ascribed herein to the operator device or pre-call recording system due to inherent differences in device capabilities. In some embodiments, other telephonic devices such as land-line phones are used with the pre-call recording system.

In one embodiment, the operator device 101 executes a pre-call recording module for automating a pre-call recording without utilizing the agency service 115. In turn, the operator device 101 may collect and transmit pre-call recording data to entities on the network 120. An example embodiment of a pre-call recording module is described in more detail with reference to FIG. 2.

In addition to the operator devices 101, a number of monitoring devices (not shown) may connect to entities on the network 120 to obtain or present data associated with one or more of the operator devices 101 and pre-call recordings. Depending on the embodiment, a monitoring device is a network 120 capable device that can be operated within an agency or externally in the field. As referred to herein, a monitoring device is a mobile or stationary device capable of connectivity (e.g., wireless or wired) to a network 120 such as an agency network, the internet, PSTN and/or cellular network. Some examples of a monitoring device include a mobile phone, land-line phone, tablet and notebook or desktop computer.

Example embodiments of the monitoring device as a mobile phone can include feature phones, smart phones or standard mobile phones. In one example embodiment, the monitoring device executes a monitoring module for interfacing with entities on the network 120 to manage operator devices 101, pre-call recordings and view collected data.

Also shown is a subject devices 105 associated with a subject the operator desires to communicate with using a desired identity. Embodiments of the various subject devices 105 include any network 120 capable device that may send or receive information associated with a transmitting number on the network 120 (however, in some instances, the subject device 105 may use a virtual number itself, or other means, to do so). Accordingly, as referred to herein, a subject device 105 is a mobile or stationary device capable of connectivity (e.g., wireless or wired) to the network 120 for sending or receiving information over the internet, PSTN and/or cellular network. Some examples of a subject device 105 include a mobile phone, land-line phone, tablet and notebook or desktop computer.

FIG. 1A also illustrates a virtual number 135 configured for use on the network 120. In one embodiment, the agency service 115 provisions and configures the virtual number 135 and handles number information to establish an identity for the virtual number on the network 120. Additionally, the agency service 115 receives connection information 137 describing operator devices 101 and subject devices 105 requesting to communicate with handled virtual numbers

135. For example, a subject device 105 may request (and attempt) to communicate with a virtual number (e.g., 135) by way of a connection request or otherwise transmitting data to the virtual number. For pre-call recording using a virtual number 135, a connection request involves the subject device 105 placing a call to the virtual number and the agency service 115 managing the connections through the virtual number 135.

Alternatively, the subject device 105 may dial a transmitting number of the operator device 101 directly, in which case the pre-call recording module on the operator device 101 handles the connection to the subject device 105 and recording of the subject.

Based on the device information and configuration of the virtual number, the agency service 115 identifies devices requesting to communicate with a virtual number as either the operator device 101 associated with the virtual number or a subject device 105 (and, in some cases, a monitoring device). For example, the agency service 115 may maintain a mapping table storing transmitting numbers and authentication information for a given operator device 101 and attached virtual numbers 135 for identifying the operator device based on the connection information 137. Additionally, the agency service 115 may maintain a mapping table identifying whether a pre-call recording should be created for subject devices 105 attempting to connect to the operator device 101.

When the operator device 101 requests to communicate with the virtual number 135, the agency service 115 identifies the transmitting number of the device as that of the operator device 101 using the mapping table. After identifying the operator device 101, the agency service 115 enables the operator device 101 to specify a given subject 105 the operator would like to communicate with and, in turn, enables the operator device 101 to communicate with the subject device 105 through (e.g., establishing a connection with or transmitting data from) the virtual number. For example, the operator device 101 specifies device information, such as a transmitting number, for the subject device 105. The agency service 115 receives the device information for the subject device 105 and transmits instructions that cause the subject device to receive a call from virtual number 135. If the subject device 105 answers, the parties are connected.

In turn, for pre-call recording, when the subject device 105 requests to communicate with the virtual number 135, the agency service 115 determines that the transmitting number of the device is not that of the operator device 101 using the mapping table. Thus, the agency service 115 may identify the device as either a monitoring device (e.g., due to a transmitting number of the monitoring device being stored in a mapping table) or subject device 105 (e.g., due to a transmitting number of the subject device not being stored in a mapping table). If the agency service 115 identifies the subject device 105 as attempting to communicate with the operator device 101 through the virtual number, the agency service 115 establishes the connection with the subject device 105 on the virtual number and audio transmitted from the subject device 105 begins being recorded. As the same time, the agency service 115 causes playback of a ring tone on the virtual number 135 to the subject device 105 such that the subject believes a connection has not yet been established (i.e., the subject is still waiting for the operator to answer the call). The operator device 101 may then be dialed from the virtual number 135 and accept the connection request from the virtual number 135 to listen to the subject as the recording is being made, and the ring tone is still being played for the subject. In such cases, the operator device 101 may be muted to prevent the subject from recognizing that a connection has already been established and the subject is being recorded and/or monitored. If the operator desires to communicate with the subject, the operator makes a selection on the operator device 101 that causes the ring tone to stop playing for the subject and unmutes the operator device 101. In some embodiments, number information for the virtual number 135 may be spoofed to match that of the subject device 105 such that the operator can identify the subject by the transmitting number of the subject device.

In instances where the subject device 105 dials the operator device 101 directly, the operator device 101 automatically or manually (e.g., using or within the pre-call recording module) opens the connection with the subject device 105 and audio transmitted from the subject device 105 may be recorded at the operator device 101 itself. The pre-call recording module plays a ring tone on the line such that the subject believes the connection is still being established. In such cases, the pre-call module may mute outgoing audio (other than the ring tone) on the operator device 101 to prevent the subject from recognizing that the call is being recorded or monitored. If the operator desires to communicate with the subject, the operator makes a selection on the operator device 101 (e.g., within the pre-call recording module) that causes the ring tone to stop playing for the subject and unmutes outgoing audio from the operator device 101.

The operator device 105 may receive connection information 137 from the agency service 115 or other entity about a subject device 105 (e.g., number information for the subject device) dialing a virtual number 135 and the number information for the dialed virtual number. Accordingly, the operator may make an informed decision about the subject's identity and the identity expected from the operator (i.e., in instances where the operator utilizes multiple virtual numbers 135). The agency service 115 may further enable the operator or agency to configure multiple virtual numbers to attach to, or associated with, a single operator device 101 for managing a variety of subjects 105. In turn, the operator may use the single operator device 101 to select which virtual number to use for connecting to a specified subject device 105 over the network 120 without compromising operator identity.

As described above, the agency service 115 provisions and configures virtual numbers 135 and handles number information to establish identities for the virtual numbers on the network 120. In some embodiments, the agency service 115 may additionally specify one or more monitoring devices (not shown) to notify when the operator device 101 or subject device 105 utilizes a virtual number 135 for communications. For example, the agency service 115 may maintain a mapping table storing transmitting numbers and authentication information for monitoring devices in associated with the virtual number 135. When the agency service 115 identifies an operator device 101 requesting to communicate using the virtual number 135 or a subject device 105 attempting to connect to the virtual number 135, the agency service 115 connects the parties while additionally notifying the monitoring device. The notifications themselves may come in different forms and are explained in more detail below.

In the case telephonic communications between the subject device 105 and the operator device 101, the agency service 115 identifies instances when the operator device 101 and the subject device 105 attempt to establish telephonic communications through the virtual number 135. In turn, the agency service 115 may transmit instructions (e.g., to a provider) to dial out to the monitoring device and connect the monitoring device with the virtual number 135. Once connected to the virtual number 135, the monitoring device receives the audio data corresponding to a pre-call recording period and/or subsequent communication between the subject device 105 and operator device 101 through the virtual number 135. In order to prevent subject suspicion as to the operator's identity, audio transmissions from the monitoring device to the virtual number and any audio associated with establishing the connecting between the monitoring device and the virtual number is disabled. If a monitoring device declined to join on the call, or requested to only be notified, the agency service 115 or provider may transmit or otherwise provide pre-call recordings and other recorded call audio (and transcripts thereof) to the monitoring device. Additionally, as portions of the pre-call recording may not have been transmitted to the operator device 101 (e.g., answering the call through the virtual number 135 after the connection has already been established and the recording already started), the agency service 115 or provider may transmit or otherwise provide pre-call recordings and other recorded call audio (and transcripts thereof) to the operator device. Transcripts and pre-call recordings may, for example, be provided via SMS/MMS message, email or other means such as the pre-call recording or a monitoring module. Alternatively, a location of the transcript and call audio for streaming from a server (e.g., of the agency service 115) may be provided via SMS, email or other means such as the pre-call recording or a monitoring module.

The network 120 represents the communication pathway between agencies, agency service 115, the operator devices 101, subject devices 105, monitoring devices and other entities (not shown). In one embodiment, the network 120 includes standard communications technologies and/or protocols and can include the Internet and PSTN. Oftentimes, these communications technologies and/or protocols carry both PSTN and Internet related data. Thus, the network 120 can include links using technologies such as Ethernet, 802.11, worldwide interoperability for microwave access (WiMAX), 2 G/3 G/4 G mobile communications protocols, worldwide interoperability for PSTN communications, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including analog audio (e.g., for last mile PSTN communications), digital audio and video (e.g., as a file or streaming with Real Time Streaming Protocol), the hypertext markup language (HTML), the extensible markup language (XML), JavaScript, VBScript, FLASH, the portable document format (PDF), etc. In addition, all or some of the data exchanged over the network 120 can be encrypted using conventional encryption technologies such as secure sockets layer (SSL), transport layer security (TLS), virtual private networks (VPNs), Internet Protocol security (IPsec), etc. In another embodiment, the entities on the network 120 can use custom and/or dedicated data communications technologies instead of, or in addition to, the ones described above. For example, some government agencies and the military may operate networks auxiliary to the internet and PSTN.

As used herein, the term "module" refers to computer program instructions and/or other logic used to provide the specified functionality. Thus, a module can be implemented in hardware, firmware, and/or software. In one embodiment, program modules formed of executable computer program instructions are stored on a non-transitory storage device, loaded into memory, and executed by a computer processor as one or more processes.

As used herein, the terms "message," "messaging," and "short messaging service (SMS)" each comprise the breadth of messaging services and related technologies or standards used for communicating and transmitting data over the network 120. These technologies and services include SMS messages, multimedia messaging service "MMS" messages, proprietary messaging service messages such as BLACKBERRY messages "BBM" and the like.

Figure 1B:
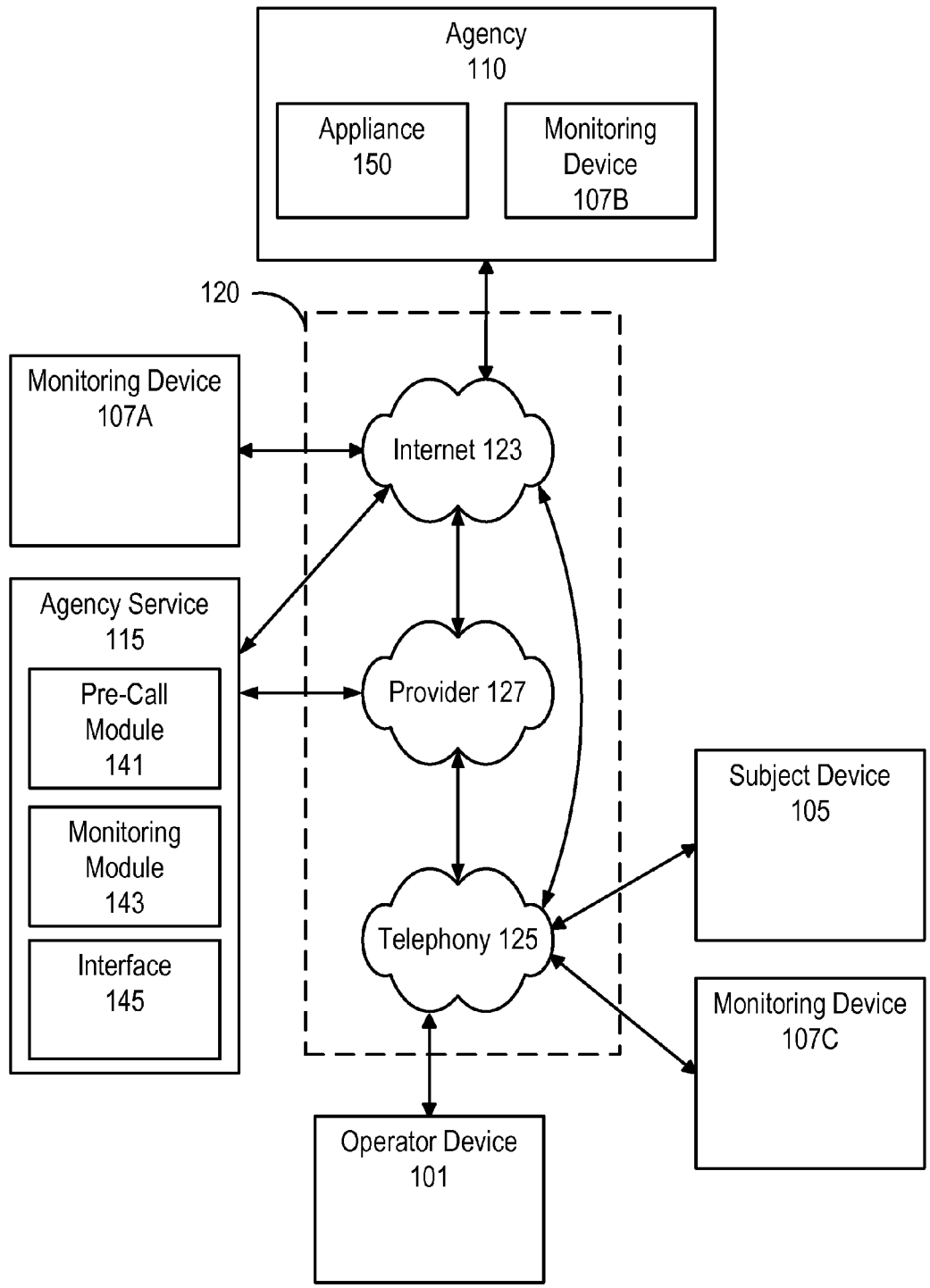
FIG. 1B is a block diagram illustrating an operating environment of an agency service providing pre-call recording services according to one example embodiment.

FIG. 1B is a block diagram illustrating an operating environment of an agency service 115 providing pre-call recording services according to one example embodiment. As shown, the operating environment includes an agency 110, monitoring devices 107, operator device 101, subject device 105, and a network 120 with components such as the internet 123, telephony 125 and provider 127. The network 120 may also include GPS satellites (not shown) that relay position data to operator devices 101 and other devices.

Agency 110 represents a collection of servers, desktop, notebook or tablet computers, mobile telephones and related storage mediums used by respective agency personnel for executing applications or modules to communicate with and receive data from the agency service 115 (e.g., via the interface 145) and other entities on the network 120. For example, agency 110 devices may execute a web browser to access a web interface or execute a mobile or desktop application for communicating with an API provided by the agency service 115. An agency 110 may also include telephonic and video infrastructure enabling audio and video communicability (e.g., internally and/or over the network 120) using the public switched telephone network ("PTSN"), voice over internet protocol ("VoIP") and video conferencing services for monitoring or specifying configurations for using operator devices 101 with virtual numbers 135.

The telephony network 125 may include servers, switches and other hardware and software for implementing, among other protocols and technologies, worldwide interoperability for PSTN communications including land-lines and 2 G/3 G/4 G wireless protocols. The telephony network 125 also provides mobile devices with the capability to transmit and receive data over the internet 123. The telephony network 125 is managed by one or more communication service providers "CSPs" (not shown) that own telephone numbers for use on the PSTN and the CSPs own network (e.g., a wireless network that communicates with the PSTN).

The provider 127 may include servers, switches and other hardware and software for communicating over the network 120 with CSPs and other entities. The provider 127 buys or leases numbers for use on the telephony network 125 from multiple CSPs. The provider 127, in turn, manages numbers provisioned for use by the agency service 115 and the telephony traffic associated with the numbers. In one embodiment, the provider 127 allows the agency service 115 to provision one or more of the numbers as virtual numbers over the network 120.

Typically, a number used on the telephony 125 network directs to a given mobile device, VoIP device or land-line device having an associated number identity characterized by automatic number identification "ANI" information, or caller identification. Virtual numbers, while still operable with the PSTN and CSP networks, are associated with the provider 127 who handles telephony traffic for the number. Because a virtual number does not direct to an end user device, the provider 127 may establish connections with devices dialing the virtual number, record call information such as call audio and caller history (e.g., on a computer readable medium) and stream/provide call information for download (e.g., over the network 120).

The provider 127 may also pass/bridge audio (bidirectional or unidirectional) in real-time between two or more telephonic devices establishing connections with the same or different virtual numbers (or connected by the provider 127 via a virtual number). Additionally, as the virtual numbers are handled by the provider 127, the agency service 115 may modify ANI information and caller identification associated with the virtual number.

In addition to provisioning virtual numbers for the agency service 115, the provider 127 communicates notifications and data associated with the virtual numbers to the agency service 115 or other entity such as the agency 110. For example, the provider 127 may notify the agency service 115 (and optionally an operator device 101 or monitoring device 107) of an incoming caller to the virtual number and receive instructions from the agency service 115 to connect the caller to the virtual number (or another device) and whether to initiate a pre-call recording. In a specific example, the agency service 115 may provide instructions for the provider 125 to notify a monitoring device (e.g., 107C) in response to use of the virtual number by either the operator device 101 or subject device 105. The provider 125, in turn, may dial out to the monitoring device 107C via the virtual number (or other virtual number) and pass (or bridge) audio such that the monitoring device 107C receives the audio transmissions between the operator device 101 and subject device 105 or monitors a pre-call recording on the virtual number. The provider 127 may also receive instructions to stop/start recordings of calls placed to the virtual number and interface with a transcription service to transcribe call audio. In turn, the provider 127 can transmit the recordings and transcripts to the agency service 115 or other entity on the network 120.

Additionally, the provider 127 may enable or disable inbound and/or outbound audio for different parties such as a monitoring device 107C or operator 101 connected or connecting to a virtual number and recordings thereof responsive to instructions received (e.g., via an API) from the agency service 115 or operator (e.g., via a key press). The provider 127 can receive instructions for managing a virtual number and notifications as part of the provisioning process, prior to an incoming call or in real-time from the agency service 115 when connecting an incoming caller to the virtual number. In some embodiments, the provider 127 communicates directly with the agency 110, operating device 101 and/or monitoring device 107 to provision virtual numbers, transmit notifications and data or receive instructions. Additionally, the provider 127 itself may function as a CSP and vice versa.

The agency service 115 receives requests for provisioning and mapping virtual number from the agency 110, operator device 101, or monitoring device 107. The requests can include number information for provisioning virtual numbers such as an area code (e.g., 555), country code (e.g., +44) and/or associated CSP. In turn, the agency service 115 queries the provider 127 for available virtual numbers matching the request and returns the matching virtual numbers to the requesting entity. The agency service 115 subsequently receives a selection of virtual numbers from the requesting entity and claims the virtual numbers from the provider 127.

When provisioning a virtual number, the agency service 115 may optionally allow the entity to specify number information such as ANI and/or caller identification associated with the virtual number to spoof the number's identity on the network 120. The agency service 115, in turn, transmits instructions to the provider 127 for modifying the number identity. The agency service 115 may optionally verify the spoofed number identity. When a virtual number is no longer needed by the agency 110A, the agency service 115 obtains any audio recordings or call logs associated with the virtual number and releases the number back to the provider 127.

Additionally, the agency service 115 may optionally allow the entity to specify number information such as a ring tone for provisioned virtual numbers. The specified ring tone may be used to spoof the location where the number is being used on the network 120 or mimic a custom ringtone when played for the subject. Specifically, as ring tones can differ between countries, and for a host of other reasons, the agency service 115 may enable the entity to configure the virtual number with the provider 127 such that a specified ring tone is played when parties (e.g., a subject) attempt to communicate with the operator 101 using the virtual number. In a real world example, if the virtual number is based in the United Kingdom and the subject expects the operator using the virtual number to be in the United States, the subject may hear (incorrectly) the ring tone for the United Kingdom when dialing the virtual number (rather than the expected United States ring tone). Accordingly, the agency service 115 may provide the entity with a list of ring tones (e.g., for different countries) and/or enable the entity to upload a desired ring tone for playback to those dialing the virtual number. The agency service 115, in turn, transmits instructions to the provider 127 for configuring the virtual number with the desired ring tone for playback. Thus, the cover of the operator may be maintained when the subject dials the virtual number and a pre-call recording is generated/the operator covertly monitors audio from the subject device 105.

The requests can also include mapping information for configuring claimed virtual number function in a mapping table. Depending on the desired configuration, the mapping information may include the transmitting number of an operator device 101 and/or and monitoring device 107, virtual number for association with the device and/or desired function of the virtual number, such as whether to generate a pre-call recording when a subject dials the virtual number in an attempt to communicate with the operator device and any specific ring tone that should be played back to the subject device. One example mapping request may specify a claimed virtual number for use as a virtual number that the operator device 101 connects to in order to transmit collected data (e.g., audio) over the telephony 125 network from the virtual number's identity (e.g., to subject devices 105). Another example mapping request may specify that pre-call recordings should be generated when a subject dials the claimed virtual number. In response to the request, the agency service 115 associates the transmitting number of the operator device 101 with the virtual number and stores the association in a mapping table, and also indicate in the mapping table whether calls should be pre-recorded.

In some embodiments, a mapping request may optionally include the transmitting number of a monitoring device 107 which the agency service 115 associates with a virtual number to identify the monitoring device. As multiple monitoring devices 107A, 107B, 107C may monitor call audio, the agency service 115 may store multiple transmitting numbers of monitoring devices in association with a single virtual number in a mapping table.

Embodiments of the mapping table may also indicate whether a specific ring tone should be used when a subject device attempts to communicate with the operator device 101 through the virtual number 135. Additionally, embodiments of the mapping table may also identify functions to perform in response to commands from the operator device. For example, when generating a pre-call recording and the operator device 101 connects to the virtual number 135 to monitor audio covertly received from the subject device, the operator may key "1" to unmute call audio from the operator device 101, stop playing the ringtone, and subsequently communicate with the subject device 105.

In practice, agency service 115 consults the mapping table to automatically identify a device connecting to a virtual number as the operator device 101, monitoring device 107 or subject device 105 based on the device's transmitting number. Thus, for example, an operator of an operator device 101 may dial a virtual number mapped to the transmitting number of his phone to place a call from the virtual number (e.g., to a subject device). Additionally, the operator of an operator device 101 may receive calls from the subject by way of the subject device connecting to the virtual number and the mapping table identifying the operator device 101 the agency service 115 should instruct the provider 127 to dial out to.

Embodiments of the agency service 115 use the mapping of the operator device 101 and pre-call recording selection for a virtual number for instructing the provider 127 to automatically connect the subject device 105 on the virtual number, begin generating a recording, and play a ring tone to the subject device. In turn, the mapping of the operator device 101 to the virtual number may be used to dial out to the operator device to listen in on the call. Additionally, embodiments of the agency service 115 use the mapping of the operator device 101 to virtual numbers for identifying when the operator device desires to use a virtual number and instructing the provider 127 to dial (e.g., from a virtual number) a subject device 105 specified by the operator and connect the parties. The agency service 115 may also provide operating devices 101 with caller and virtual number details through the interface 145, via SMS message or email.

Additionally, embodiments of the agency service 115 can use the mapping of monitoring devices 107 to virtual numbers (e.g., directly, of via an associated virtual number) for instructing the provider 127 to automatically dial (e.g., from a specified virtual number or the virtual number) or otherwise notify (e.g., a SMS message) monitoring devices when pre-recordings are generated and calls are placed or received using a given virtual number. The agency service 115 may also notify monitoring devices 107 through the interface 145 or via email.

To prohibit unauthorized access to virtual numbers, the agency service 115 may allow personnel and operators to specify key-ins when provisioning and/or mapping virtual numbers. The agency service 115 stores the key-ins in the mapping table or other suitable database structure to identify and authenticate callers attempting connections to the virtual numbers responsive to correct key-ins. Depending on the embodiment, the agency 110, agency service 115 or provider 127 may store the mapping table and/or key-ins for device identification and authentication.

In some embodiments, the agency service 115 provides a pre-call module 141 to the operator device 101. The pre-call module 141 interfaces with the native dialer of the operator device 101 to automate the connection process to a given subject device 105 for pre-call recording. The pre-call module 141 may transmit the collected data over the network 120 back to the agency service 115 or other entity. The agency service 115, in turn, may store the collected data for transmission to one or more monitoring devices 107 and the agency 110. Furthermore, the pre-call module 141 may be configured with a password or otherwise disguised when executed to prevent users other than the operator from accessing the module altogether and/or particular features. The pre-call module 141 is described in more detail with reference to FIG. 2.

In some embodiments, the agency service 115 includes an interface 145 for providing recorded pre-calls, either on the virtual number or received from the operator device 101, and call audio between operators and subjects to various monitoring devices 107 and/or appliances 150 over the network 120. For example, the interface 145 may provide monitoring devices 107 with data corresponding to the status (e.g., connected or disconnected) of one or more operator devices 101 and the corresponding virtual number and subject device information. If the operator device 101 is transmitting real-time data or connected to a subject device 105, the interface 145 can stream data such as audio from the active transmission, GPS coordinates with heading, speed and coordinates of last-reported locations for placement on a map, and the internet protocol address and/or telephone numbers of other personnel monitoring or having access to the operator device or virtual number. In some embodiments, the interface 145 syncs collected data prior to transmission or includes tags in the transmitted data for synchronization of playback at the monitoring device 107 or operator device 101. The interface 145 can also stream, or provide for download, previously recorded monitoring sessions.

In some embodiments, the agency service 115 provides a monitoring module 143 to monitoring devices 107 for accessing the interface 145. The monitoring module 143 transmits requests associated with configuring an operator device 101 and receiving real-time and historic data. For example, the monitoring module 143 may provide a user interface or status dashboard with options for provisioning virtual numbers, mapping a transmitting number of an operator device 101 or monitoring device 107 to a given virtual number and configuring pre-call recordings on a virtual number. In one embodiment, the dashboard provides an option to toggle a pre-call recording session or bi-directional recording session on or off with the agency service 115. When a recording session is disabled, the monitoring device 107 or operator device still receives real-time data, but the agency service 115, appliance 150 and provider 127 do not store copies of the collected data.

The monitoring module 143 may also display real-time status information for the operator device 101 including current GPS location, tracked GPS location, live audio, mapping table information and other information collected from the operator device, operator device 101, or virtual number and streamed by the interface 145. Similarly, the monitoring module 143 may be used to access and playback historic activity associated with a given virtual number or operator device 101. For example, the monitoring module 143 may download files such as pre-call recordings for playback or stream them. In addition to interfacing with the agency service 115, the monitoring module 143 may interface with an appliance 150 that stores (or backs up) collected data within the agency 110.

The monitoring module 143 may interface with the native dialer of the monitoring device 107 and notify the monitor when connection requests from virtual numbers are received (e.g., in instances where the monitoring device 107 is dialed in to monitor a call). Embodiments of the monitoring module 143 may also be configured to automatically establish the connection with the virtual number. The monitoring module 143 may display information for the virtual number and, optionally, the subject device 105 and/or operator device 101 using the virtual number with the notification. Displayed information for the virtual number, operator device 101, and/or subject device 105 may include associated number information, mapping information, and/or case information stored at the agency service 115, provider 127, and/or appliance 150. For example, the monitoring module 143 may communicate with the agency service 115 and/or appliance 150 to receive mapping information and case information corresponding to Virtual numbers (and operating devices) the transmitting number of the monitoring device 107 executing the monitoring module 143 is authorized to monitor. Additionally, the monitoring module 143 may include functionality of the pre-call module 141 and vice versa.

In one embodiment, the agency 110 includes an appliance 150 for storing data such as pre-call recordings collected by operator devices 101 and virtual numbers. The appliance 150 may utilize the monitoring interface 145 provided by the agency service 115 for updating stored data or receive data directly from operator devices 101. Additionally, the appliance 150 may receive audio recorded on a virtual number and associated transcripts from the provider 127 or agency service 115. One example embodiment of the appliance 150 also includes its own interface (not shown) that enables monitoring devices 107 and operator device to access real-time and historic data stored on the appliance for a virtual number. Interfaces provided by the agency service 115 or appliance 150 may also be accessible via a web browser for streaming or downloading data and include the same or similar options.

Additionally, the appliance 150 and agency service 115 may communicate to intermittently update collected data and records at defined intervals or in response to notifications to download data. During the intervals or notification periods, the agency service 115 may process the data and perform any necessary actions as desired by operator devices 101 or monitoring device 107 until the data is transferred to the appliance 150. In some embodiments, the agency service 115 maintains a persistent connection with the appliance 150 to facilitate transfer of real-time data collected by operator devices 101 operated in the field.

In one embodiment, the agency service 115 ensures that it, and the provider 127, do not possess data collected by operator devices 101 or from a virtual number beyond the time needed to facilitate transfer. However, in mission critical situations, operators and other agency 110 personnel cannot rely only on the availability of the appliance 150 for storing and maintaining collected data. Consequently, if the appliance 150 is unable to take possession of the collected data or go offline during transfer, the agency service 115 and/or the provider 127 may maintain possession of the collected data until the appliance 150 is functioning. Furthermore, the agency service 115 and/or provider 127 may determine whether checksums, hashes or sizes of transferred data match the appliance's 150 version prior to deleting stored data.

In some embodiments, the agency service 115 maintains an appliance instead of, or in addition to, the agency 110. In such cases, the appliance may exist as a dedicated piece of hardware or remote storage. Alternatively, embodiments of the appliance 150 may be implemented in a cloud computing and storage stack available on the network 120.

Operator Device Functionality

Figure 2:
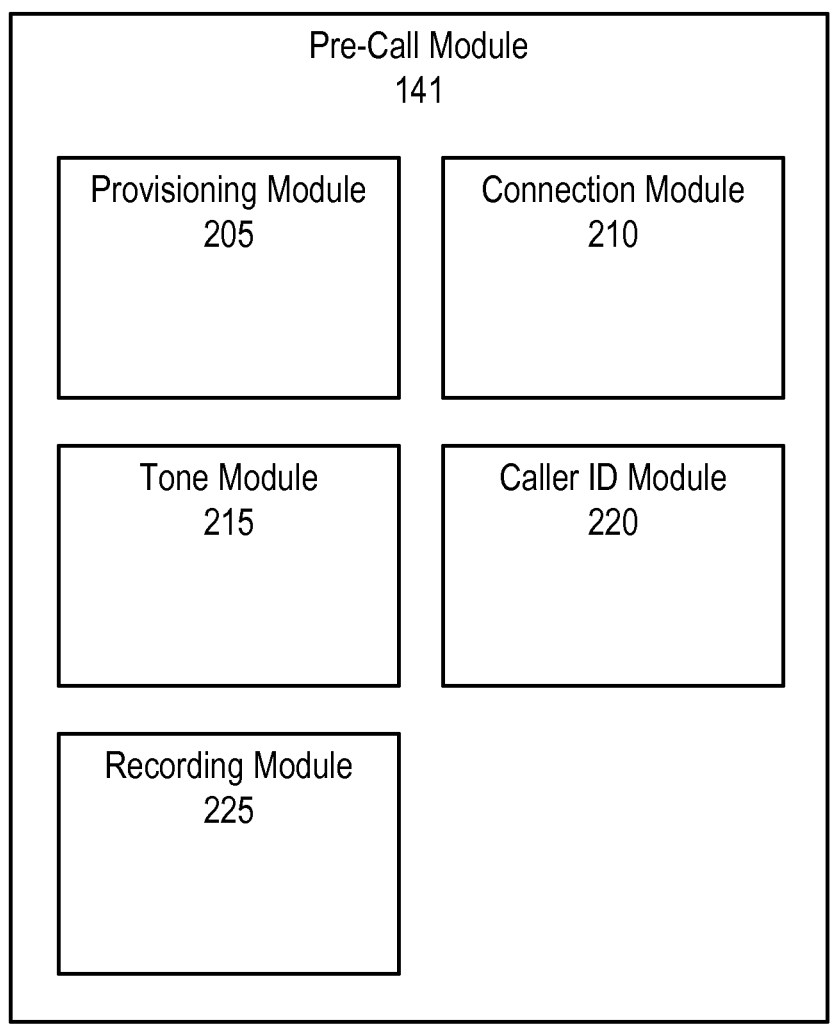
FIG. 2 is a block diagram illustrating a pre-call recording module according to one example embodiment.

FIG. 2 is a block diagram illustrating a pre-call recording module 141 according to one example embodiment. As mentioned above, the pre-call module 141 may be downloaded from the agency service 115 to the operator device 101 and executed to facilitate pre-call recordings with, and without numbers and collect and transmit data to entities on the network 120. As shown in FIG. 2, the pre-call module 14 itself includes multiple modules. In the embodiment shown in FIG. 2, the pre-call module 141 includes a provisioning module 205, connection module 210, tone module 215, caller ID module 220, and recording module 225. In some embodiments, the functions are distributed among the modules in a different manner than described herein. Other embodiments have additional and/or other modules.

The provisioning module 205 interfaces with the provider 127 or agency service 115 to provision virtual numbers and modify virtual number assignments and function in the field. Alternatively, a web browser on the operator device 101 may be used. For example, the web browser accessing interface 145 at the agency service 115 or provisioning module 205 may present the operator with a list of all virtual numbers associated with a given account, transmitting number, or virtual number. Through the interface 145 or provisioning module 205, the operator may provision and modify mapping and function of the virtual numbers, such as whether to pre-call record a subject. Additionally, for example, the operator may specify number information for a virtual number or specify a ring tone for playback when the virtual number is dialed.

The connection module 210 automates the connection process for generating a pre-call-recording and connecting to a subject when the operator device is dialed directly. For example, the connection module 210 may immediately establish a connection and mute the operator device. Additionally, the connection module 210 may interface with the tone module 215 to play a ring tone on the line for the subject and the recording module 225 to generate the pre-call recording. The connection module 210 may also include functions for mimicking a dropped call or a busy line signal in response to an operator's selection. In such cases, the connection module 210 interfaces with the tone module 215 and the recording module 225 to play the appropriate tone and record the subject. The subject need not be recorded for the operator to listen in on the real-time audio received from the subject. If the operator does not answer the phone, the connection module 210 may mimic a voicemail box as the subject would normally expect.

In another embodiment, the connection module 210 may be configured to forward directly dialed calls (from numbers other than the virtual number) to the virtual number by entering the call forwarding command. For example, *21*[Virtual Number]# may be used to forward all incoming calls to the Virtual Number, which may in turn handle the pre-call recording process. With call forwarding activated, when the subject dials the operator device 101, the call is immediately and undetectably forwarded to the virtual number, where the provider 127 can begin call recording and play a ringing sound back to the subject. At this point the operator device 101 specified in the mapping table receives a connection request from the virtual number. In some embodiments, number information for the subject may be displayed instead of the virtual number 135 such that the operator can identify the subject's transmitting number. The device receiving the call at this stage may differ from the one originally dialed based on the device information specified in the mapping table.

In one embodiment, to prevent an infinite forwarding loop where a call made to the operator device from the virtual number is forwarded to the virtual number, back to the operator device, back to the virtual number, and so on. the operator may elect to use conditional Call-Forwarding Busy/Rejected by entering, for example, *67*[Virtual Number]#. With conditional call-forwarding, when the subject dials the operator device 101, the operator device will ring, then the operator may reject it manually by pressing "Reject Call" to forward the connection request through the virtual number. The connection module 210 may detect the initial incoming connection request from the subject device and automatically reject the connection request to route the subject device through the virtual number. For example, the connection module 210 may reject the first incoming call automatically, but display the second on the operator device 101 for the operator to act on to connect to the subject device 105 through the virtual number. The rejection is the condition that forwards the incoming connection request to the virtual number, which in turn forwards the call back to the operator device 101. This time, the second incoming call within a brief period is answered by the operator to covertly listen to the subject device. Pre-call recording begins when the first rejected call is routed by way of the rejection through the virtual number.

The connection module 210 may interface with the agency service 115 to receive information about virtual numbers associated with a given virtual number or the transmitting number of the operator device 105. The connection module 210 may then present an interface to the operator indicating one or more available virtual numbers with their number information for selection and whether pre-call recordings are generated.

In one embodiment, the connection module 210 detects whether incoming calls were initially placed to a virtual number. The connection module 210 subsequently determines virtual number and/or subject device 105 information for display to the operator. In one embodiment, the connection module 210 accesses a locally or remotely stored address book to retrieve an address book entry associated with the virtual number and/or subject device 105. Alternatively, the connection module 210 may receive and display notifications from the agency service 115 or provider 127 about incoming calls. Based on the notification or address book information, the operator may review the appropriate identity expected by the subject and/or the subject. Because pre-call recordings on the virtual number may be managed by the agency 115 and/or provider 127, the connection module 210 may not perform a local pre-call recording sequence for the incoming call. However, the connection module 210 may display to the operator available options for the connection and transmit selections to the agency service 115 and/or provider 127 on the telephonic connection or via a separate connection (e.g., over the internet). Specific options for selection include whether the operator would like to open bi-direction connection with the subject, send the subject to voicemail, drop the call, or perform another function described herein.

Depending on the operator device's 101 capabilities, the connection module 210 may enable placement/receipt of multiple outgoing and incoming calls to virtual and non-virtual numbers within the native dialer application or similar dialer displayed by the connection module.

The tone module 215 stores tones that may be played back to the subject device 105. Additionally, the tone module 215 may transmit tones to the agency service 115 or provider for playback when the subject connects to a virtual number or when the operator device 101 desires to perform a particular function as described herein.

The caller ID module 220 interfaces with the provider 127 or agency services 115 to modify caller ID or other number information associated with provisioned virtual numbers. For example, the caller ID module 220 presents an interface to the operator to specify number information such as location, ownership, carrier and whether or not any of the information should be restricted or blocked when dialing out to the subject device 105 from a given virtual number.

The recording module 225 stores call recordings on the operator device for direct connection pre-call recordings. The recording module 225 may also retrieve pre-call recordings that were generated on the virtual number. In one embodiment, the recording module 225 retrieves a transcript of pre-call recording audio for the operator's review.

In some embodiments, the pre-call module 141 and the modules therein interface and communicate with non-native devices attached to the operator device 101. For example, audio data can be determined from accessories coupled (e.g., wired microphone) or wirelessly connected (e.g., Bluetooth headset) to the operator device 101.

Additionally, some or all of the features provided by the Pre-call module 141 may require the operator to enter a specified key-in (e.g., button press combination, password or other personal identification) prior to operation or launch.

Virtual Number Provisioning

Figure 3A:
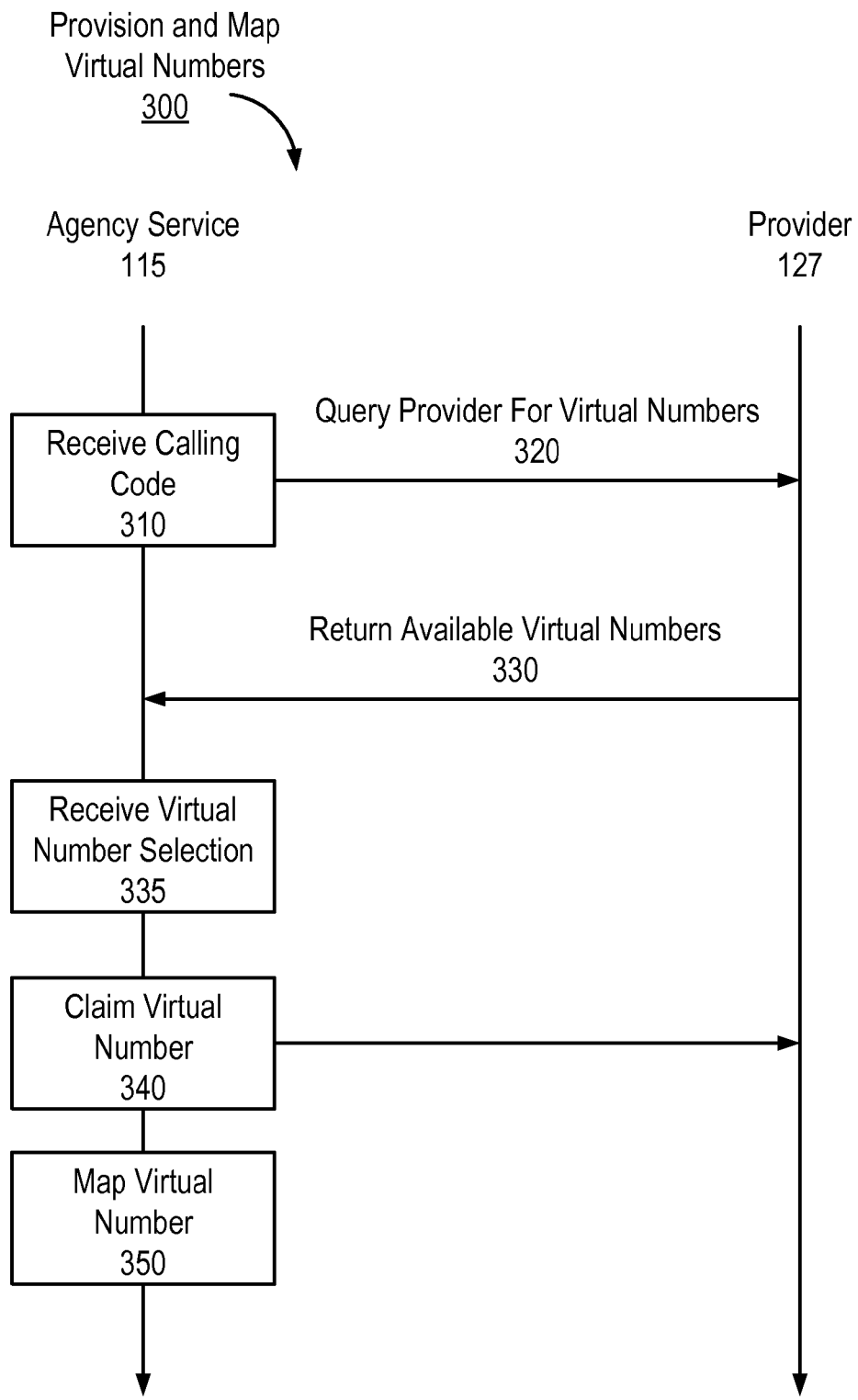
FIG. 3A is an interaction diagram illustrating a method for provisioning and mapping virtual numbers for operating an operator device and pre-call recording with virtual numbers according to one example embodiment.

FIG. 3A is an interaction diagram illustrating a method for provisioning and mapping virtual numbers for operating an operator device and pre-call recording with virtual numbers according to one example embodiment. Initially, the agency service 115 receives 310 a request including a calling code for provisioning 300 a virtual number from a monitoring device 107, operator device 101, provided web interface or other entity. The calling code can include an area code and country code where the provisioned virtual number will be operated. The agency service 115 queries 320 the provider for virtual numbers matching the specified calling code. The provider 127 returns 330 a list of available virtual numbers to the agency service 115 which, in turn, transmits the virtual numbers for display to the requestor. The agency service 115 receives 335 one or more virtual number selections and claims 340 each selected virtual number from the provider 127. The agency service 115 may optionally include modified number information for a claimed virtual number. For example, the agency service 115 may optionally include corresponding ANI and caller identification information for a virtual number. Additionally, the agency service 115 may optionally include a ring tone specified for playback when the virtual number is dialed. The number information may be edited on the requesting device 101, 107 or in the web interface. The agency service 115 subsequently stores the modified virtual number information and instructs the provider 127 to update the associated virtual number information to configure the virtual number.

With one or more virtual numbers claimed, the agency service 115 can receive mapping requests for the virtual numbers and, in turn, map 350 the virtual numbers responsive to information in the mapping request. For example, the requestor may be prompted to enter the transmitting number of an operator device 101 for association with a virtual number and whether call from subject devices 105 connecting to the virtual number should be pre-call recorded. The agency service 115 stores the transmitting number of the operator device 101 and the Virtual number in a mapping table (e.g., at the agency service 115 or on the appliance 150). The requestor may modify the mapping at any time, without any interruption of service at the receiving number.

Example embodiments of monitoring device 107 mapping to virtual numbers and/or virtual numbers can be performed in the same or similar fashion as operator device 101 mappings. Monitoring device 107 mapping to virtual number and/or virtual numbers may be used to authorize monitoring devices to listen in on call audio between an operator device 101 and subject device 105. Additionally, the mapping may be used to automatically notify a specified monitoring device 107 when the corresponding Virtual number is used for communications.

FIG. 3B is a table illustrating an example embodiment of virtual number mapping 350 for operating an operator device 101 with virtual numbers for pre-call recording according to one example embodiment. As shown, mapping table 360A includes a number of Virtual numbers 363A mapped to a corresponding transmitting number 361A (e.g., of operator device 101). Also shown is a "pre-call record" mapping indicating whether pre-call recordings should be generated for calls receives from a subject on the virtual number.

When the agency service 115 receives information from the provider 127 about connection requests to virtual numbers 363A from the network 120, the agency service identifies the connecting device as the operator device 101 based on the transmitting number 361A stored in the mapping table 360A. In turn, the agency service 115 or provider 127 receives a subject number from the operator device 101 and dials the corresponding subject 105 from the Virtual number 363A. If the connecting device's number does not match the transmitting number 361A, the agency service 115 identifies the device as a subject device 105 and checks the mapping table pre-call record instruction 365 to determine whether to initiate the pre-call recording process for the virtual number. If no pre-call record should be generated, the agency service 115 dials or instructs the provider 127 to dial the specified transmitting number for the operating device 101. In some embodiments, the mapping table 360A may include an option to covertly record the operator device (e.g., that of an informant) when placing a call to the subject on the virtual number and hide the pre-call recording sequence of the subject from the informant.

In some embodiments, the mapping table 360A further includes mappings of monitoring device 107 transmitting numbers to explicitly identify authorized monitoring devices in addition to operating devices 101.

FIG. 3C is a table illustrating an example embodiment of virtual number mapping 350 for automatically notifying a monitoring device 107 of a pre-call recording according to one example embodiment. As shown, mapping table 360C includes a number of virtual numbers 363C mapped to a corresponding monitoring number 367 (e.g., of monitoring device 107).

When the agency service 115 receives connection requests to virtual numbers 363C from the network 120, the agency service may identify the connecting device as a subject device 105 or operator device 101 using, for example, mapping table 360A. The agency service 115 enables operator devices 101 to specify a subject device 105 for dialing out to, from the virtual number 363C, and also manages connect requests from subject devices 105 to communicate with the operator device 101 corresponding to the dialed virtual number 363C and whether to generate a pre-call recoding. In either instance, the agency service 115 may identify one or more monitoring numbers 367 associated with the Virtual number 363C. The agency service 115, in turn, may automatically instruct the provider 127 to dial out to the identified monitoring numbers 367 when the virtual number 363C is used such that the monitoring devices 107 may receive pre-recordings and call audio.

In the embodiment shown in FIG. 3C, the agency service 115 may instruct the provider 127 to dial out from the virtual number 363C or otherwise connect the monitoring device 107 with the virtual number 363C. In such cases, audio transmitted from the monitoring device 107 or associated with connection process (e.g., any dial tones) to the virtual number 363C may be disabled.

Figure 4A:
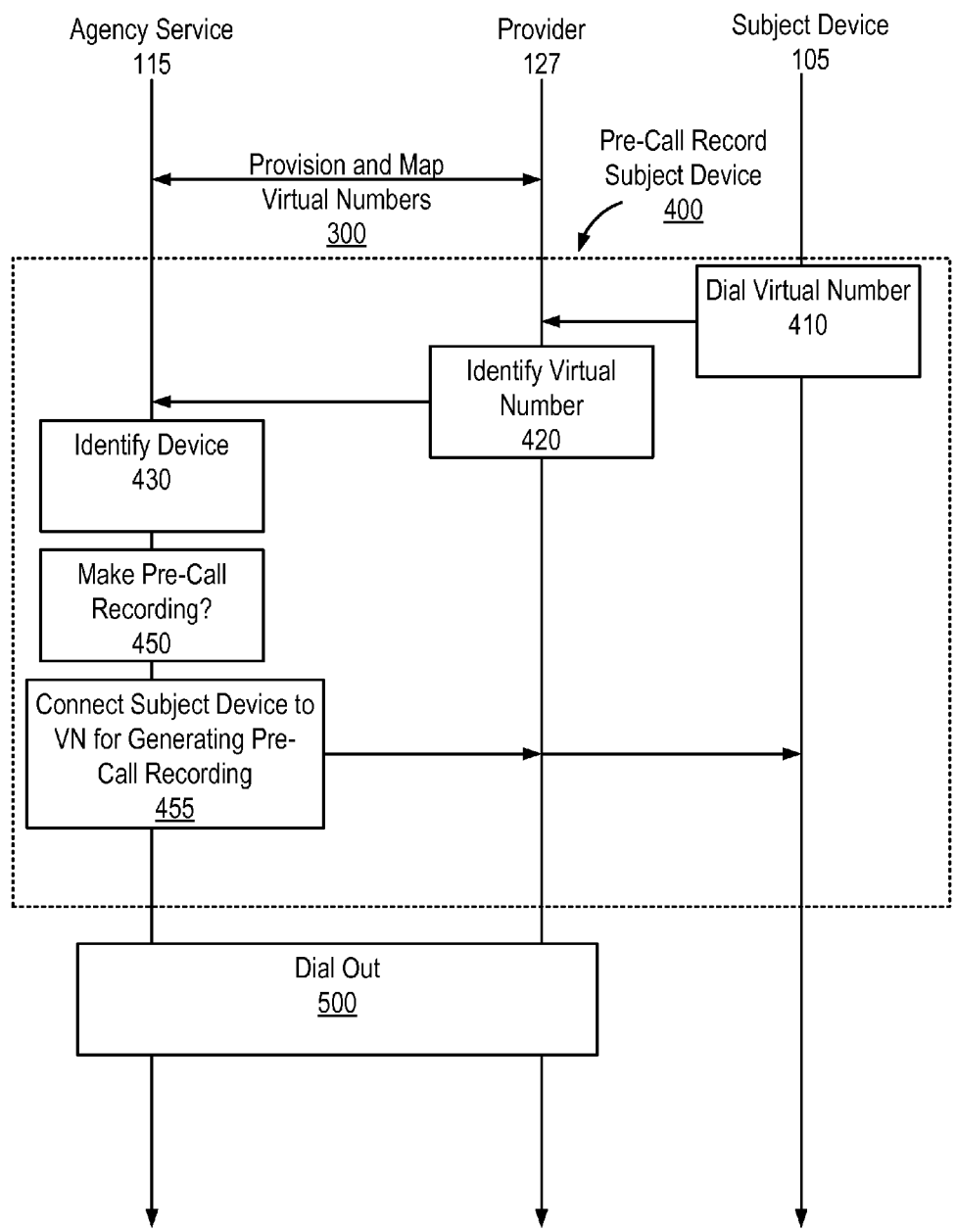
FIG. 4A is an interaction diagram illustrating a method for pre-call recording a subject device according to one example embodiment.

FIG. 4A is an interaction diagram illustrating a method for pre-call recording a subject device 105 according to one example embodiment. Once the agency service 115 provisions 300 a virtual number with the provider 127, an operator device 105, monitoring device 107 or subject 105 may connect to the virtual number. However, each entity may be treated differently as explained below.

For any device 101, 105 or 107 dialing 410 the virtual number, the provider 127 receives the connection request via the telephony network 125 and identifies 420 the dialed number as a virtual number provisioned 300 by agency service 115. Accordingly, in embodiments where the agency service 115 stores the mapping table, the provider 127 passes the transmitting number of the device attempting to connect to the virtual number and the virtual number to the agency service 115.

The agency service 115, in turn, identifies 430 the device attempting to connect to the virtual number as an operator device 101, monitoring device 107 or subject 105 based on the mapping table. The agency service 115, in turn, instructs the provider 127 to connect (or disconnect) 440 the identified device and provide options or perform operations according to the device's classification.

Subject Device

In one embodiment, the agency service 115 identifies 430 devices with numbers that do not match a transmitting number stored in the mapping table for a virtual number as subject devices 105. The agency service 115 determines whether to make a pre-call recording 450 based on the mapping table. To generate a pre-call recording 400, the agency service 115 instructs the provider 127 to connect 455 the subject device to the virtual number and record audio on the line. In turn, the agency service 115 identifies the transmitting number associated with the virtual number and instructs the provider 127 to attempt to connect the subject device 105 to the operator device 101 (e.g., by dialing out 500 to the operator device 101 directly, or through the virtual number). In some embodiments, the agency service 127 may identify a monitoring number of a monitoring device 107 associated with the virtual number in the mapping table. The agency service 127, in turn, may instruct the provider 127 establish a connection with the monitoring device 107 for passing pre-call audio and call audio between the subject device 105 and the operator device 101 on the virtual number.

Operator Device

In the case of the operator device 101 dialing a virtual number, the agency service 115 determines that the transmitting number stored in the mapping table for the dialed virtual number matches the number of the device attempting to connect to the virtual number. The agency service 115 then instructs the provider 127 to connect the device to the virtual number as the operator device 101.

Once the operator device 101 connects to the desired Virtual number (e.g., via selection or directly), the operator may enter the number of the subject device 105 (e.g., transmitting number of the subject's device) that the operator would like to dial from the Virtual number. The provider 127, in turn, dials out 500 to the subject number from the Virtual number (displaying Virtual number information) and connects the parties. In some embodiments, the agency service 127 may identify a monitoring number of a monitoring device 107 associated with the Virtual number or virtual number in the mapping table. The agency service 127, in turn, may instruct the provider 127 establish a connection with the monitoring device 107 for passing call audio between the subject device 105 and the operator device 101 on the virtual number.

In some embodiments, the agency service 115 may identify 430 the operator device 101 and determine to make a pre-call recording of the operator device while dialing out to the subject device. In such cases, the agency service 115 instructs the provider 127 to begin generating a pre-call recording of audio received from the operator device 101 when the operator device 101 is connected to the virtual number.

Monitoring Device

In the case of a monitoring device 107 dialing a Virtual number, the agency service 115 may determine that a transmitting number for a monitoring device stored in the mapping table for the dialed Virtual number matches the number of the device. The agency service 115 then instructs the provider 127 to connect the device to the virtual number as a monitoring device 107 and disable (e.g., mute) audio received from the monitoring device 107.

Additional Considerations

In some embodiments, the PSTN or provider 127 fails to pass the transmitting number associated with an operator device 101 (or monitoring device 107) to the provider or agency service 115. For example, the provider 127 or agency service 115 may receive a number other than the operator device's 101 and incorrectly identify the operator device. Some example PSTN and provider 127 failures are all zeroes numbers (+00 000-000-0000), restricted numbers (737-874-2833) or simply an incorrect number for the operator device 101. In any instance, the agency service 115 may be unable to identify the operator device 101 by the received transmitting number.

The agency service 115 may recognize that some numbers are passed incorrectly (e.g., a restricted number or zeroes number). In response (e.g., for calls to a virtual number), the agency service 115 may play a prompt or instruct the provider 127 to play a prompt such as "press 1 for an operator device or press 2 for a monitoring device." The prompt can also be ambiguous (e.g., please enter the extension of the party you are trying to reach or similar). Operators or personnel may then key-in as using an operator device 101 or monitoring device 107.

Alternatively, as the key-ins of the operator device 101 and monitoring device 107 typically differ, the agency service 115 may instruct the provider 127 to simply play a generic tone or number not available recording to notify users that they need to key-in. The matching of a key-in with stored authentication information identifies the operator device 101 (or monitoring device 107) on the virtual number.

In some embodiments, the agency service 115 may prompt all devices connecting the virtual number to key-in for identification. For example, an agency 110A may want to enable the option to use unmapped devices as operator devices 101 on a specified virtual number.

While prompts are effective for identification on a virtual number (e.g., as only operators and personnel typically have knowledge of the number and it may further require key-in of a PIN), these methods are ineffective for number pass failures to virtual numbers as subjects 105, typically, must be tricked into believing they are making a legitimate, confidential call when they (as opposed to the operator device 101 or monitoring device 107) dial the Virtual number. Accordingly, PSTN or provider 127 failures to pass the transmitting number associated with a device making a call to a virtual number may be handled differently.

In one embodiment, the agency service 115 may instruct the provider to begin the dial out 500 process as if the unidentified device were a subject device 105. Once the dial out 500 begins, the operator (or monitor) will realize that their device was not recognized (e.g., because no menu was presented or prompt was played and the provider 127 is dialing out). A subject, on the other hand, would assume operation as normal. In order to capitalize on this difference, the agency service 115 may instruct the provider 127 to capture a key-in during the dialing process for identifying the requesting device as a monitoring device 107 or operator device 101. The requesting device is then identified and connected with the virtual number according to the provided key-in.

Generating a Pre-Call Recording

Figure 4B:
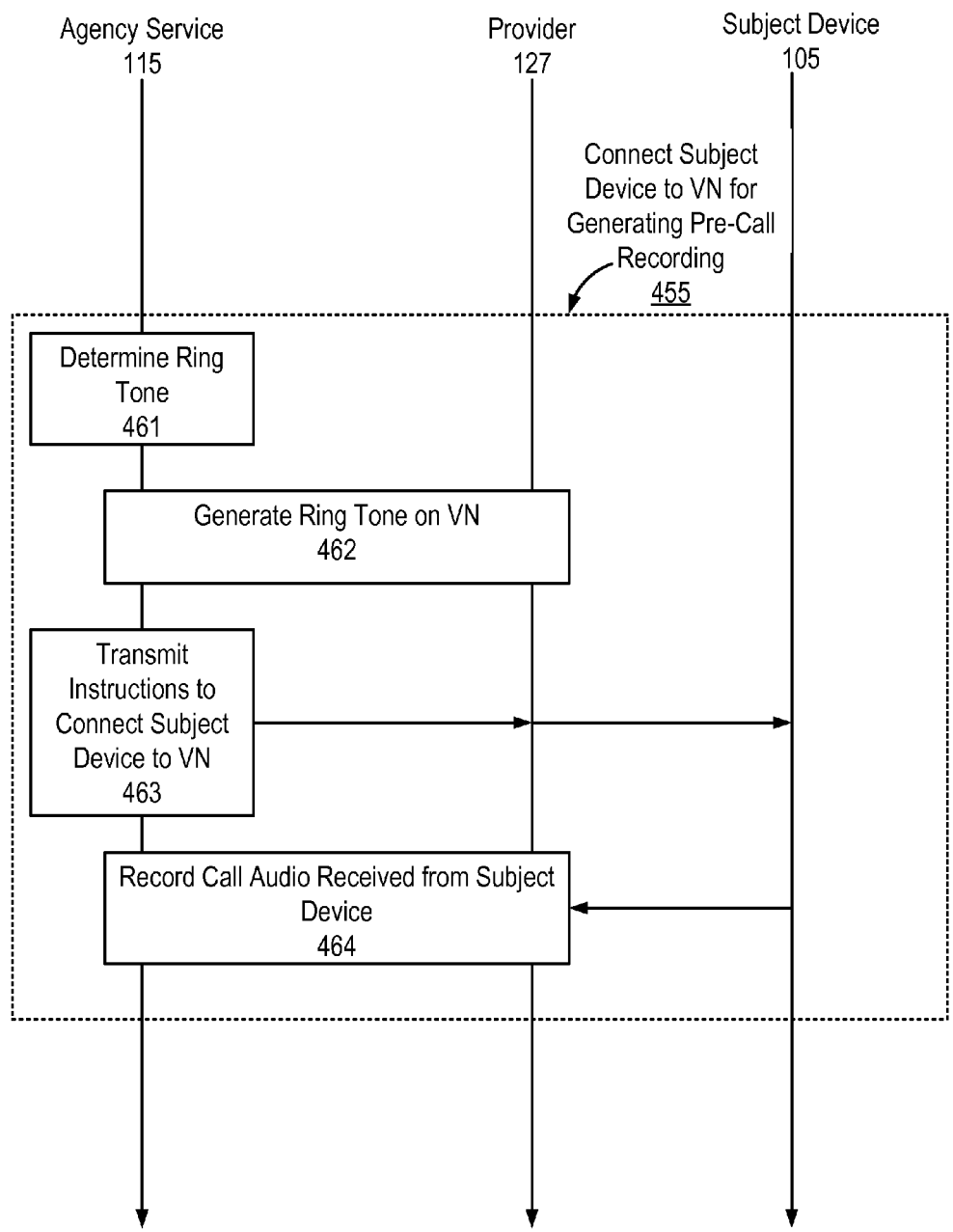
FIG. 4B is an interaction diagram illustrating a method for connecting a subject device to a virtual number for generating a pre-call recording according to one example embodiment.

FIG. 4B is an interaction diagram illustrating a method for connecting 455 a subject device to a virtual number for generating a pre-call recording according to one example embodiment. Once the agency service 115 identifies the subject device and determines to make a pre-call recording, the agency service 115 interfaces with the provider to coordinate the connection 455 of the subject device to the virtual number for covertly generating the pre-call recording. The agency service 115 determines a ring tone 461 for playback to the subject device 105 while the subject is connected to the virtual number. The agency service 115 may select a generic ring tone based on the location of the virtual number according to the country or area code or identify a specified ring tone for the virtual number. As ring tones can differ between countries, and for a host of other reasons, the ring tone played for the subject may need to differ from a default ring tone for the virtual number, e.g., based on the location of where the subject expects the operator to be. For example, if the virtual number is based in the United Kingdom and the subject expects the operator to be in the United States, the subject may hear an incorrect ring tone as the United Kingdom ring tone may be played. Accordingly, the agency service 115 may instruct the provider 127 to play, and continue to play a ring tone specified (e.g., a specified mp3 file) on the virtual number. The ring tone specified for the virtual number may be that of the location where the operator is located (e.g., default, based on country code of transmitting number) or that of a location where the operator using the virtual number is expected to be (e.g., configured, by the agency service 115 or other entity). Thus, the expected ring tone may be played for the subject.

The agency service 115 may transmit the ring tone audio or otherwise instruct the provider 127 to generate 462 the selected ring tone on the virtual number. In turn, the agency service 115 instructs the provider 127 to connect 463 the subject device 105 to the virtual number. The subject device 105 connects to the virtual number and hears the generated ring tone, still believing the call is being connected. Meanwhile, the provider 127 records 464 or otherwise provides call audio on the line from the subject device 105 to the agency service 115 for generating the pre-call recording and dials out 500 to the operator device 101.

Operating an Operator Device

Figure 5:
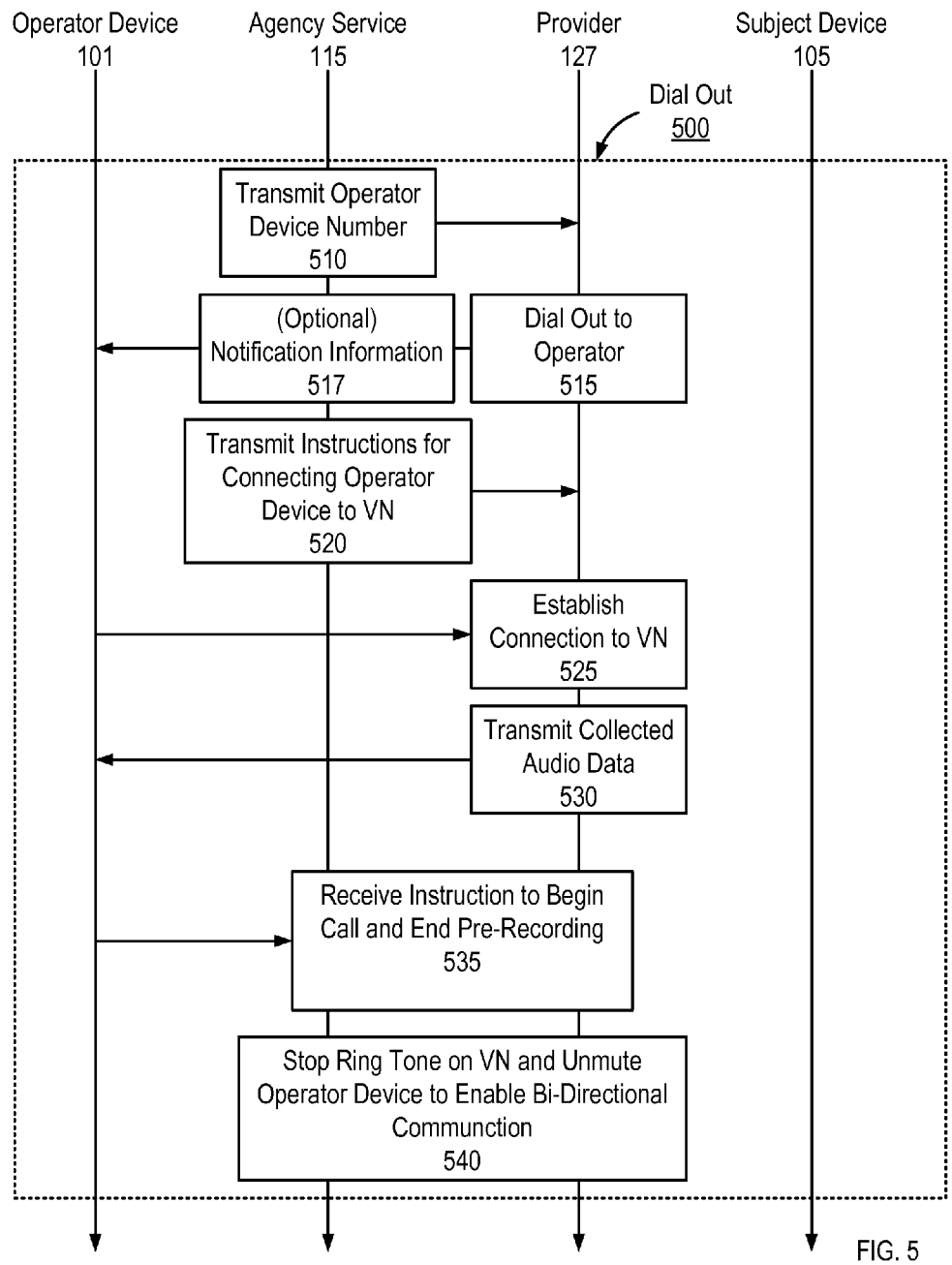
FIG. 5 is an interaction diagram illustrating a method for dialing out to an operator device to monitor a pre-call recording and communicate with the subject device according to one example embodiment.

FIG. 5 is an interaction diagram illustrating a method for dialing out 500 to an operator device 101 to monitor a pre-call recording and communicate with the subject device according to one example embodiment. As described above, the subject device 105 initiates 410 a connection to a virtual number and the agency service 115 instructs the provider 127 to dial out to the operator device 101 after establishing a connection between the subject device 105 and the virtual number to generate the pre-call recording. Accordingly, the agency service 115 transmits 510 the transmitting number of the operator device 101 as stored in the mapping table for the virtual number to the provider 127.

The agency service 115 previously instructed the provider 127 to connect the subject device 105 to the virtual number but continue to play a ring tone on the line after establishing the connection and record pre-call audio from the subject device. In effect, the subject device 105 is connected to the virtual number but does not know a connection has already been established because the ring tone is still playing; nor is the subject aware that a pre-call recording of audio on the line is being generated. Temporally proximate to establishing the connection between the subject device 105 and the virtual number, the provider 127 dials out 515 to the provided transmitting number of the operator device 101. Notification information 517 identifying the virtual number information and subject device 105 information may be transmitted to the operator device 110 by the agency service 115 and/or provider 127. The agency service 115 further transmits 520 instructions to the provider 127 for connecting the operator device to the virtual number when the operator answers the call. Specifically, in one embodiment, the agency service 115 transmits instructions to the provider 127 that causes the provider 127 to establish 525 the connection between the operator device 101 and the virtual number with the operator device 101 muted on the line and the ring tone still playing for the subject device 105. If the operator does not answer the call, the provider 127 may generate audio on the line corresponding to a voicemail recording. The pre-recording may continue until the subject hangs up, e.g., after leaving a voicemail.

The operator may answer the call to listen to the collected audio data 530. The operator may subsequently provide an instruction 535 to being communicating with the subject device. An instruction 535 (e.g., a key in) to begin the call and end the pre-recording process is shown. Other instructions may cause the provider 127 to imitate a voicemail box for the subject device 105, busy signal, or disconnection. In one embodiment, a pre-call recording module executing on the operator device 101 provides an interface from which the operator may select the desired operation and transmit the corresponding instruction to the agency service 115 and/or provider 127.

If the provider 127 receives 535 the instruction to begin the call and end the pre-call recording process, the provider 127 stops the ring tone 540 played for the subject device 105 and establishes bi-direction communication between the operator device 101 and the subject device 105 on the virtual number.

In another embodiment, where the agency 115 does not want an operator such as an informant made aware of the pre-call recording process, the agency service 115 and provider 127 may skip steps 530 and 535 when the operator device establishes 525 the connection to the virtual number. In such cases, the operator device 101 accepting the connection request causes the process to move to step 540 to establish communications and end the pre-call recording along with ring tone playback to the subject device. Additionally, in some embodiments, the provider 127 may receive instructions for the operator device 101 to generate another covert recording of the subject device. For example, the operator device 101 may transmit an instruction causing the provider 127 to mimic that the operator device 101 was dropped from the call.

Once the bi-direction communication 540 between the operator device 101 and the subject device 105 is established, the provider 127 may continue to record call audio on the line. The operator device 101 collects audio data using a microphone coupled to the operator device. The operator device 101, in turn, transmits 525 the collected audio data to the provider 127 and subject device 105 by way of the connection through the virtual number. The subject device 105 communicates with the operator device 101 in a similar fashion. The provider 127 may additionally enable monitoring devices 107 to connect to the virtual number to monitor the call and/or transmit the audio data received from the operator device 101 and the subject device 105 to the agency service 115 or appliance 150 over the network 120.

The provider 127 and/or the agency service 115 may update an appliance 150 with the received audio data. The agency service 115 or provider 127 may also update the appliance with any other data received from the provider 127 and/or operator device 101.

In some embodiments, the agency service 115 may instruct the provider 127 to automatically dial in a monitoring device 107 for receiving re-call recording and call audio between the operator device 101 and subject device 105. The agency service 115 may identify monitoring devices 107 to dial in 600 based on mapping table information, for example, as illustrated in FIG. 3C.

Monitoring an Operator Device

Figure 6:
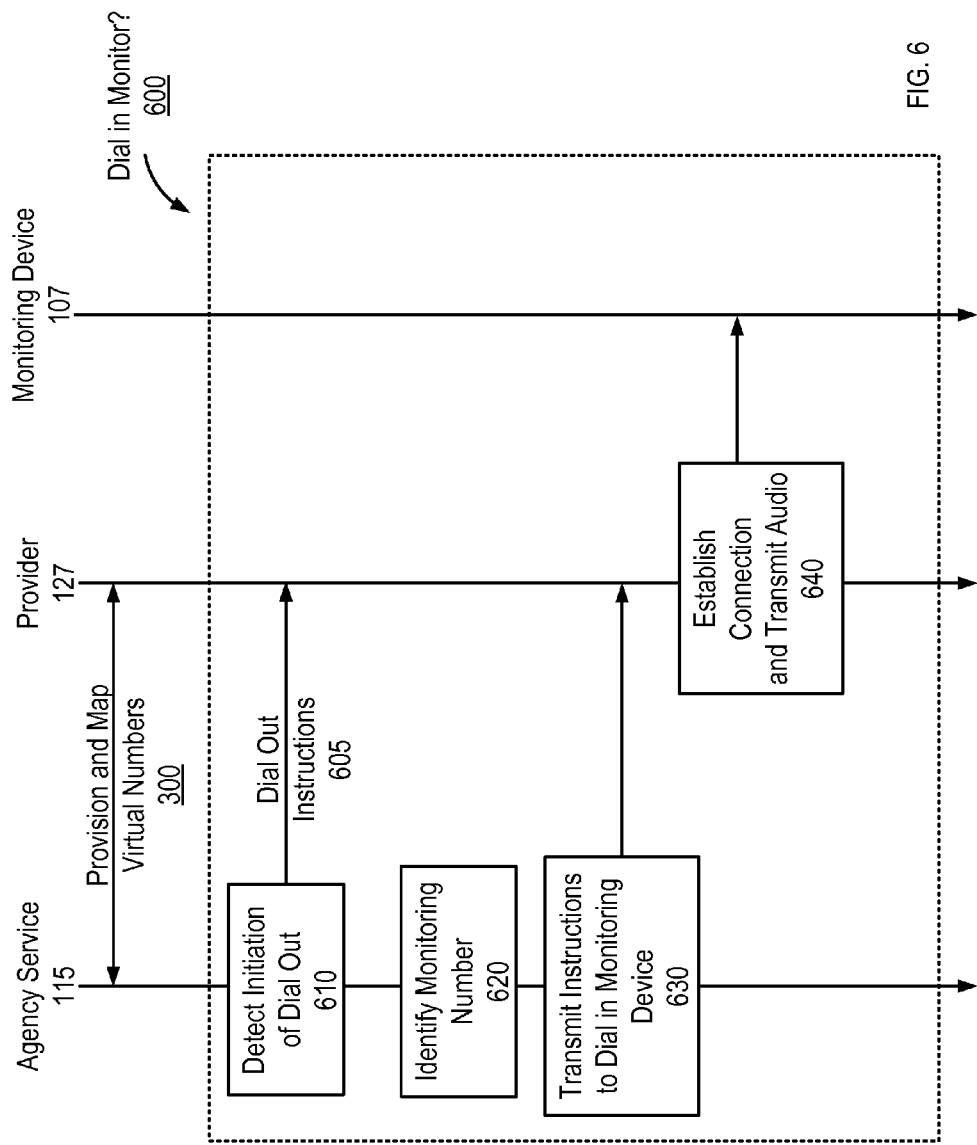
FIG. 6 is an interaction diagram illustrating a method for dialing in a monitoring device to monitor a pre-call recording according to one example embodiment.

FIG. 6 is an interaction diagram illustrating a method for dialing in 600 a monitoring device 107 to monitor a pre-call recording according to one example embodiment. As described above, the agency service 115 and/or provider 127 may provision virtual numbers and store mapping information 300 for the virtual numbers in mapping table (e.g., as shown in FIG. 3C). In some embodiments, the agency service 115 may store a mapping table associating virtual numbers with monitoring numbers (transmitting numbers of monitoring device 107) to identify monitoring device for automatically receiving call audio between a operator device 101 and subject device 105.

In one embodiment, the agency service 115 detects 610 the initiation of a dial out using a virtual number. For example, the agency service 115 may detect when dial out instructions 605 are transmitted to the provider 127 or processed at the provider to perform a dial out. The dial out instructions 605 may comprise instructions for the provider 127 to establish a connection between a contract device 105 and operator device 101 using a virtual number. For example, as shown in FIG. 5, the agency service 115 may detect when the provider 127 receives the dial out number transmitted 510 after identification in the mapping table or when the provider 127 connects a subject device to the virtual number to generate a pre-call recording and begins to dial out 515 to the operator device 101.

Once the agency service 115 detects 610 the initiation of a dial out by way of a virtual number, the agency service identifies 620 any monitoring numbers associated with the virtual number in the mapping table (e.g., as shown in FIG. 3C). In turn, the agency service 115 transmits instructions 630 to the provider 127 for dialing in the monitoring device to receive pre-call and call audio on the Virtual number. The agency service 115 may identify 620 multiple monitoring numbers and transmit instructions enabling multiple monitoring device 107 to receive call audio.

The provider 127 receives the instructions and establishes 640 a connection with the monitoring device 107. For example, the provider 127 may dial in the monitoring device 107 from the virtual number associated with the monitoring number (transmitting number) of the monitoring device. While the monitoring device 107 is being dialed in, a connection for generating a pre-call recording of subject device 105 may be in the process of being established or already established. In either instance, the provider 127 may disable audio from the monitoring device 107 such that the subject is (or will be) unaware of the monitor's presence on the line. The monitoring device 107 may also dial the virtual number to listen in on the call at any time.

In some instance, the connection with the monitoring device 107 may be established after the connection between the subject device 105 and operator device 101 has ended, for example, the call between the subject and operator lasts only 10 seconds and the monitor answers the dial in at 13 seconds. In turn, the agency service 115 and/or the provider 127 may inform the monitor of the status of the connection between the subject device 105 and the operator device 101 and optionally playback pre-call recordings and call audio.

The agency service 115 and/or the provider 127 may prompt the monitor to enter a key-in or key selection within a predetermined period of time from initiating the dial in 600. For example, when establishing 640 the connection the monitor may be required to "Press 1 to join the call in progress" (e.g., in response to an audible prompt), where pressing 1 causes the provider to connect the monitoring device 107. Providing the key-in or key selection indicates to the provider 127 that the monitor is on the line and optionally authenticates the monitor. Failure to provide the key in or key selection within the predetermined period of time may cause the provider 127 to terminate the connection, thus preventing a partial conversation between the subject and operator from being saved to the monitor's voicemail or an unauthorized person from monitoring the call.

Additionally, a monitoring module 143 may interface with the native dialer of the monitoring device 107 and notify the monitor when a dial in is received 600. The monitoring module 143 may display information associated with the dial in such as number information for the parties and Virtual number being used, mapping information, and/or case information including pre-call and other recordings stored at the agency service 115, provider 127, and/or appliance 150. For example, the monitoring module 143 may communicate with the agency service 115 and/or appliance 150 to receive mapping information and case information corresponding to Virtual numbers (and operating devices) the transmitting number of the monitoring device 107 executing the monitoring module 143 is authorized to monitor.

In some instances, the monitoring device 107 receives notifications from the monitoring interface 145 for display in the web browser or with the monitoring module 143. Example notifications include audio or visual alerts for notifying personnel if the operator device 101 stops transmitting real-time data (e.g., ends the call).

Method for Pre-Call Recording

Figure 7:
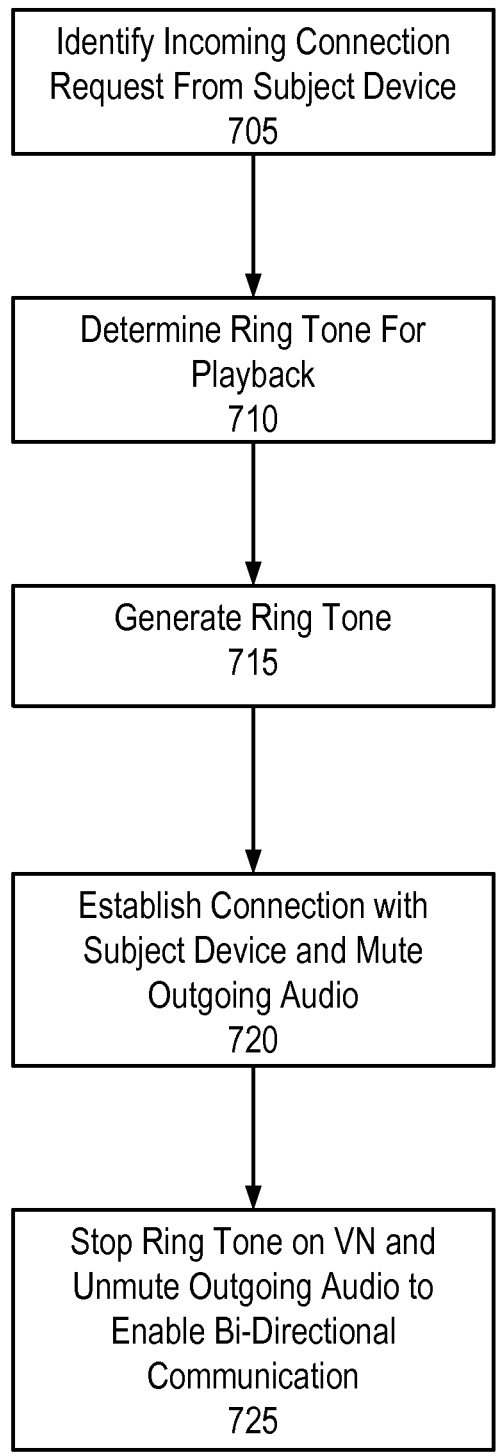
FIG. 7 is a diagram illustrating a method for performing a pre-call recording at an agency service according to one example embodiment.

FIG. 7 is a diagram illustrating a method for performing a pre-call recording at an agency service according to one example embodiment. In one embodiment, a pre-call recording module performs the steps for pre-call recording (which in some embodiments, may take place at the operator device). In other embodiments, a pre-call recording system including an agency and provider coordinate to generate pre-call recordings. In some embodiments, the pre-call recording module may operate within the pre-call recording system and issue instructions during the pre-call process.

First, incoming connection requests from a subject device 105 to an operator device 101 are identified. A ring tone for playback to the subject device 105 is determined 710 for imitating that a connection between the subject device 105 and operator device 101 is still being established. In some embodiments, a virtual number may be used to establish a connection to the subject device 105. The determined ring tone is generated 715 on the virtual number or by the operator device 101 prior to, or simultaneous to, establishing 720 the connection with the subject device and muting outgoing audio (other than the ring tone, in some embodiments) from the operator device. During this time period, the subject believes a connection is still in the process of being established while the operator or other entity may monitor and/or record pre-call audio.

When the operator desires to communicate with the subject, the operator may provide a selection on the operator device 101 to stop 725 the ring tone on the virtual number (or generated by the pre-call recording module) and unmute outgoing audio from the operator to the subject. Alternatively, for pre-calls recorded through a virtual number, the pre-call recording and playback of the ring tone may end once the operator answers the forwarded call and/or initially when picking up the call to establish the connection through the virtual number (e.g., automatically upon answering).

Summary

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer based method comprising:
    receiving information in response to a connection request from a telephonic device to a virtual number associated with an operator device, the information including device information corresponding to the telephonic device and the virtual number;

identifying the telephonic device as a subject device based on a comparison of the device information with device information stored in association with the virtual number in a mapping table;
in response to identifying the telephonic device as the subject device, transmitting instructions for:
    connecting the subject device with the virtual number to receive audio from the subject device on the virtual number;
    playing a ring tone to the subject device to mimic indication of an ongoing connection request; and
    generating a recording of audio received from the subject device over the connection with the virtual number during the mimicking of the indication of an ongoing connection request;
identifying the operator device associated with the virtual number in the mapping table;
in response to identifying the operator device associated with the virtual number, transmitting instructions for:
    connecting the operator device with the virtual number;
    muting audio from the operator device to the subject device; and
    transmitting received audio from the subject device on the virtual number to the operator device; and
transmitting instructions to stop playback of the ring tone and unmute the audio from the operator device to establish bi-directional communications between the operator device and the subject device.

2. The method of claim 1, wherein device information includes a transmitting number of the telephonic device.

3. The method of claim 2, wherein the telephonic device is identified as the subject device in response to a lack of a match between the transmitting number of the telephonic device with a transmitting number stored in association with the virtual number in the mapping table.

4. The method of claim 1, further comprising transmitting the instructions to stop playback of the ring tone and unmute the audio from the operator device in response to receiving an indication from the operator device to begin the bi-directional communications.

5. The method of claim 1, wherein transmitting the instructions to stop playback of the ring tone and unmute the audio from the operator device to establish bi-directional communications between the operator device and the subject device further comprises:
    instructing a provider to execute the instructions in response to a key-in received from the operator device to begin the bi-direction communication.

6. The method of claim 1, wherein connecting the operator device with the virtual number comprises providing a transmitting number of the operator device to a provider for dialing in to the virtual number.

7. The method of claim 1, further comprising transmitting instructions for recording audio transmitted between the subject device and operator device during the bi-directional communications.

8. The method of claim 1, further comprising transmitting a notification to a monitoring device that audio on the virtual number is being recorded.

9. The method of claim 1, further comprising:
    provisioning the virtual number based on number information received for the virtual number;
    receiving mapping information for the virtual number, the mapping information including a transmitting number corresponding to the operator device; and
    storing the virtual number in the mapping table as a receiving number in association with the transmitting number corresponding to the operator device.

10. The method of claim 1, wherein connecting the operator device with the virtual number comprises providing the operator device with number information specified for the virtual number and the device information for the subject device.

11. A system comprising:
a server comprising one or more processors and a non-transitory computer-readable storage medium storing computer program code, the computer program code when executed performing steps comprising:
    receiving information in response to a connection request from a telephonic device to a virtual number associated with an operator device, the information including device information corresponding to the telephonic device and the virtual number;
    identifying the telephonic device as a subject device based on a comparison of the device information with device information stored in association with the virtual number in a mapping table;
    in response to identifying the telephonic device as the subject device, transmitting instructions for:
        connecting the subject device with the virtual number to receive audio from the subject device on the virtual number;
        playing a ring tone to the subject device to mimic indication of an ongoing connection request; and
        generating a recording of audio received from the subject device over the connection with the virtual number during the mimicking of the indication of an ongoing connection request;
    identifying the operator device associated with the virtual number in the mapping table;
    in response to identifying the operator device associated with the virtual number, transmitting instructions for:
        connecting the operator device with the virtual number;
        muting audio from the operator device to the subject device; and
        transmitting received audio from the subject device on the virtual number to the operator device; and
    transmitting instructions to stop playback of the ring tone and unmute the audio from the operator device to establish bi-directional communications between the operator device and the subject device.

12. The system of claim 11, further comprising transmitting the instructions to stop playback of the ring tone and unmute the audio from the operator device in response to receiving an indication from the operator device to begin the bi-directional communications.

13. The system of claim 11, further comprising transmitting instructions for recording audio transmitted between the subject device and operator device during the bi-directional communications.

14. The system of claim 11, further comprising transmitting a notification to a monitoring device that audio on the virtual number is being recorded.

15. The system of claim 11, further comprising:
    provisioning the virtual number based on number information received for the virtual number;
    receiving mapping information for the virtual number, the mapping information including a transmitting number corresponding to the operator device; and storing the virtual number in the mapping table as a receiving number in association with the transmitting number corresponding to the operator device.

16. The system of claim 11, wherein connecting the operator device with the virtual number comprises providing the operator device with number information specified for the virtual number and the device information for the subject device.

17. The system of claim 11, further comprising:
a second server comprising one or more processors and a computer-readable storage medium storing computer program code, the computer program code when executed performing steps comprising:
identifying connection requests from telephonic devices to the virtual number;
connecting a telephonic device to the virtual number;
mimicking indication of an ongoing connection request by playing a ring tone to a telephonic device connected to the virtual number;
recording audio received on the virtual number;
dialing out to a telephonic device from the virtual number;
muting audio from a telephonic device; and
establishing a connection between telephonic devices on the virtual number.

18. The system of claim 17, wherein transmitting the instructions to stop playback of the ring tone and unmute the audio from the operator device to establish bi-directional communications between the operator device and the subject device further comprises:
receiving the instructions at the second server; and
executing the instructions in response to a key-in received from the operator device to begin the bi-direction communication.

19. The system of claim 17, wherein connecting the operator device with the virtual number comprises providing a transmitting number of the operator device to the second server.

20. A computer based method comprising:
receiving information in response to a connection request from a telephonic device to a virtual number associated with an operator device, the information including device information corresponding to the telephonic device and the virtual number;
identifying the telephonic device as a subject device based on a comparison of the device information with device information stored in association with the virtual number in a mapping table;
in response to identifying the telephonic device as the subject device, transmitting instructions for:
connecting the subject device with the virtual number to receive audio from the subject device on the virtual number;
playing a ring tone to the subject device to mimic indication of an ongoing connection request; and
identifying the operator device associated with the virtual number in the mapping table; and
in response to identifying the operator device associated with the virtual number, transmitting instructions for connecting the operator device with the virtual number to monitor received audio from the subject device on the virtual number prior to establishing bi-directional communications between the operator device and the subject device.

* * * * *